(12) United States Patent
Korte et al.

(10) Patent No.: US 10,343,645 B2
(45) Date of Patent: Jul. 9, 2019

(54) SEATBELT SHOULDER ANCHOR

(71) Applicant: Honda Motor Co., Ltd., Tokyo (JP)

(72) Inventors: Joseph H Korte, Marysville, OH (US);
Dustin M Schultz, Lynchburg, SC (US); Matthew L. Taracko, Marysville, OH (US); Kirk M. Rausch, North Lewisburg, OH (US)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 15/468,548

(22) Filed: Mar. 24, 2017

(65) Prior Publication Data

US 2018/0272988 A1 Sep. 27, 2018

(51) Int. Cl.
*B60R 21/13* (2006.01)
*B60R 22/18* (2006.01)
*B60R 22/24* (2006.01)

(52) U.S. Cl.
CPC .............. *B60R 22/24* (2013.01); *B60R 21/13* (2013.01); *B60R 2022/1818* (2013.01)

(58) Field of Classification Search
CPC . B60R 22/18; B60R 2022/1818; B60R 22/24; B60R 21/13
See application file for complete search history.

(56) References Cited

U.S. PATENT DOCUMENTS

| | | | |
|---|---|---|---|
| 4,065,156 A | 12/1977 | Tanaka et al. | |
| 4,973,082 A | 11/1990 | Kincheloe | |
| 5,096,224 A * | 3/1992 | Murakami | B60R 22/24 280/801.1 |
| 5,641,193 A | 6/1997 | Zepnik et al. | |
| 5,779,270 A * | 7/1998 | Tanaka | B60R 21/04 280/751 |
| 6,123,391 A * | 9/2000 | Boelstler | B60R 22/203 297/464 |
| 7,325,832 B2 * | 2/2008 | Miki | B60R 21/13 280/756 |
| 7,740,279 B2 * | 6/2010 | Wright | B60R 22/1951 280/808 |
| 7,802,819 B2 * | 9/2010 | Ng | B60R 22/18 280/808 |
| 7,815,217 B2 * | 10/2010 | Nakao | B60R 21/2338 280/730.2 |
| 7,874,606 B2 * | 1/2011 | Yamamura | B60N 2/3011 296/182.1 |
| 8,087,694 B2 | 1/2012 | Johnson et al. | |
| 8,336,914 B2 | 12/2012 | Ito et al. | |

(Continued)

FOREIGN PATENT DOCUMENTS

CN 1081141 C 3/2002
EP 3275739 A1 * 1/2018 ............. B60R 21/13
(Continued)

*Primary Examiner* — Nicole T Verley
(74) *Attorney, Agent, or Firm* — Honda Patents & Technologies North America, LLC; Mark E. Duell

(57) ABSTRACT

A roll bar system for a motor vehicle includes a roll bar pipe having a first hole formed in the roll bar pipe, a collar disposed within the first hole of the roll bar pipe, a seat belt assembly, and a fastener. The seat belt assembly includes a seat belt and an anchor. The anchor include an engagement mechanism for engaging the seat belt and a flange having a fastener hole. The fastener attaches the flange of the anchor to the collar.

9 Claims, 3 Drawing Sheets

SECTION A-A

(56) References Cited

U.S. PATENT DOCUMENTS

| | | | |
|---|---|---|---|
| 8,408,599 B2 * | 4/2013 | Strnad | B60R 22/18 280/801.1 |
| 8,651,525 B2 | 2/2014 | Kaku et al. | |
| 8,678,439 B2 * | 3/2014 | Marziani | B60R 22/18 280/805 |
| 8,864,174 B2 | 10/2014 | Minami et al. | |
| 9,623,836 B2 * | 4/2017 | Kujawa | B60R 22/195 |
| 2011/0027040 A1 * | 2/2011 | Wright | B60R 22/24 411/180 |
| 2015/0274120 A1 | 10/2015 | Hayashi et al. | |

FOREIGN PATENT DOCUMENTS

| | | | | |
|---|---|---|---|---|
| JP | S6124649 A | 2/1986 | | |
| JP | H0558240 A | 3/1993 | | |
| JP | 3495716 B2 * | 2/2004 | | B60R 21/055 |
| JP | 3820233 B2 | 9/2006 | | |
| JP | 4426959 B2 * | 3/2010 | | |
| JP | 5220537 B2 * | 6/2013 | | |
| JP | 6067361 B2 * | 1/2017 | | |
| JP | 6187210 B2 * | 8/2017 | | |

* cited by examiner

SECTION A-A

SEATBELT SHOULDER ANCHOR

TECHNICAL FIELD

The embodiments described herein are related to the field of seat belts assemblies for a motor vehicle.

BACKGROUND

In the past, seat belt shoulder anchors were bolted to a collar that was in turn welded to a bracket that was then fixed to the rollover protection system of the motor vehicle. There was a need identified to reduce the complexity of anchoring the seat belt shoulder anchor to the the rollover protections system, to lessen the number of parts to reduce vehicle weight, and to lessen the number of steps of assembling the motor vehicle.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a roll bar system for a motor vehicle includes a roll bar pipe having a first hole formed in the roll bar pipe, a collar disposed within the first hole of the roll bar pipe, a seat belt assembly including a seat belt and an anchor, the anchor including an engagement mechanism for engaging the seat belt and a flange having a fastener hole, and a fastener for attaching the flange of the anchor to the collar.

According to another aspect, a system for attaching a seat belt assembly, which includes a seat belt and an anchor including an engagement mechanism for engaging the seat belt and a flange having a fastener hole, to a frame member of a motor vehicle, includes a collar disposed within a first hole of the frame member and a fastener for attaching the flange of the anchor to the collar.

According to yet another aspect, a seat belt assembly, which includes a seat belt and an anchor including an engagement mechanism for engaging the seat belt, attached to a frame member of a motor vehicle, includes a seat belt, an anchor including an engagement mechanism for engaging the seat belt and a flange having a fastener hole, a collar disposed within a first hole of the frame member, and a fastener for attaching the flange of the anchor to the collar.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
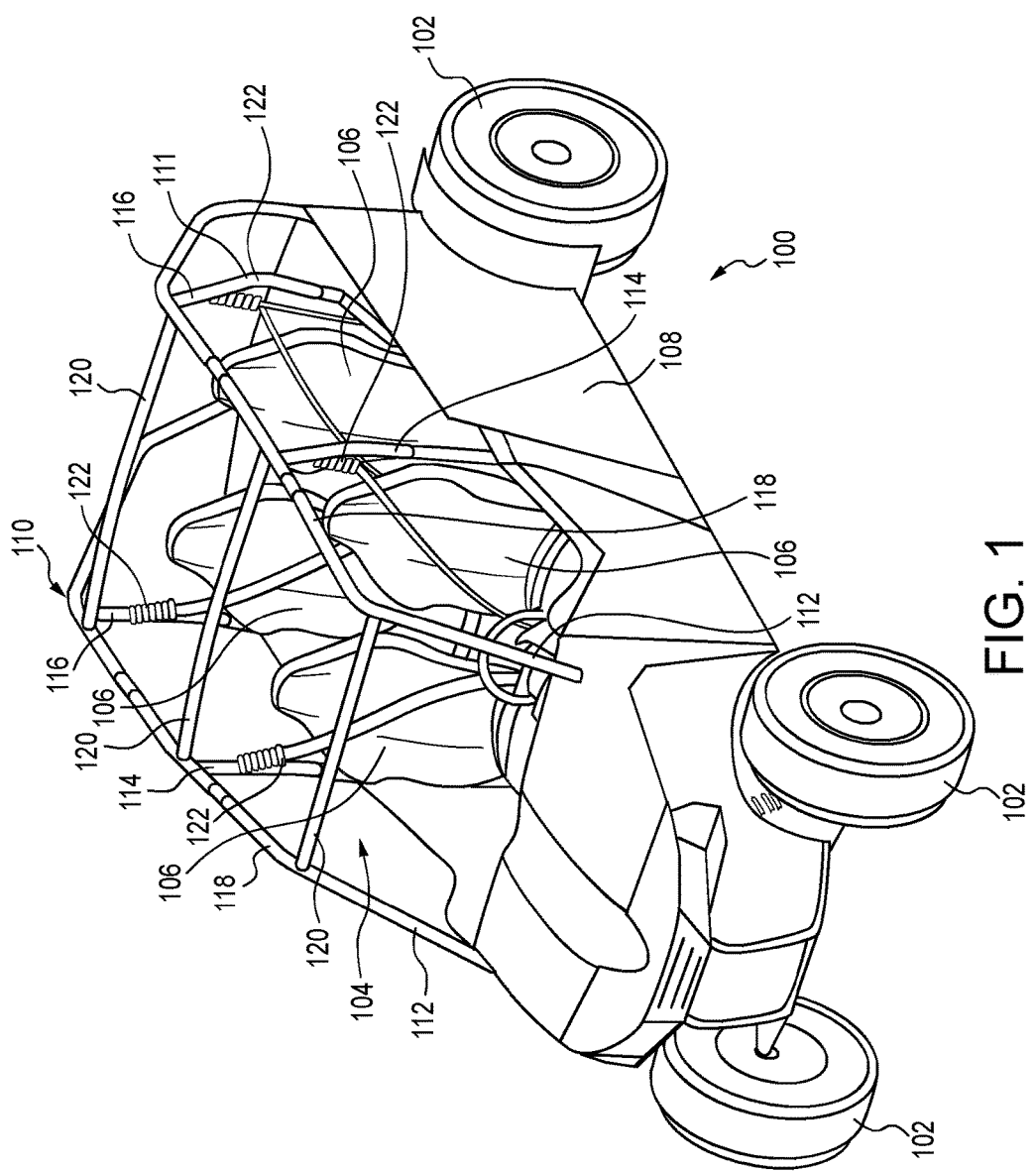
FIG. 1 is perspective view of a motor vehicle.

FIG. 1 illustrates a perspective view of a motor vehicle 100 of the type typically described as a side-by-side sport utility vehicle. The motor vehicle 100 includes wheels 102, a passenger cabin 104, seats 106 located within the passenger cabin 104, a body 108 that defines the outside of passenger cabin 104, and a rollover protection structure 110 that defines the upper frame members of the motor vehicle 100. The rollover protection structure 110 includes a number of tubular roll bar pipes 111 that may include A-pillars 112, B-pillars 114, C-pillars 116, side rails 118, and roof rails 120 that cross between the side rails 118. The motor vehicle 100 may also include seat belt assemblies 122 associated with each of the seats 106.

Figure 2:
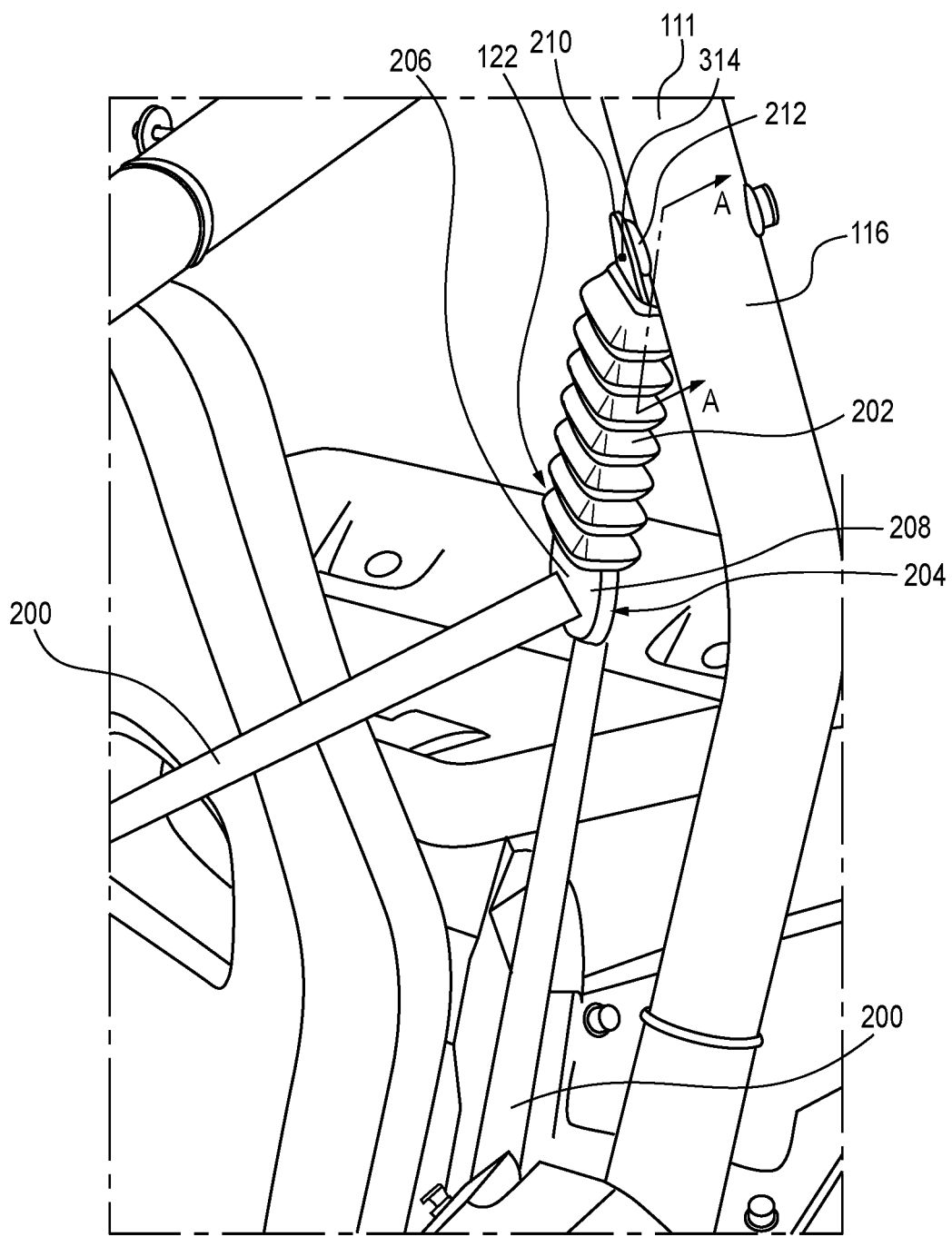
FIG. 2 is a close up perspective view of a portion of the motor vehicle of FIG. 1.

FIG. 2 is a close up of a portion of FIG. 1 illustrating how the seat belt assembly 122 is connected to the tubular roll bar pipe 111 that forms C-pillar 116. The connection between the seat belt assemblies 122 and the B-pillars 114 and the remaining C-pillar 116 are all the same as that illustrated in FIG. 2 and described herein.

As illustrated, the seat belt assembly 122 includes a seat belt 200 and an anchor 202, which forms the connection point to the tubular roll bar pipe 111. The anchor 202 includes an engagement feature 204, such as a slot 206 in a lower flange 208 through which the seat belt 200 is threaded. The seat belt retractor (not illustrated) is located within the body 108. The anchor 202 further includes a flange 210 that forms an attachment point with a collar 212 seated in the tubular roll bar pipe 111.

Figure 3:
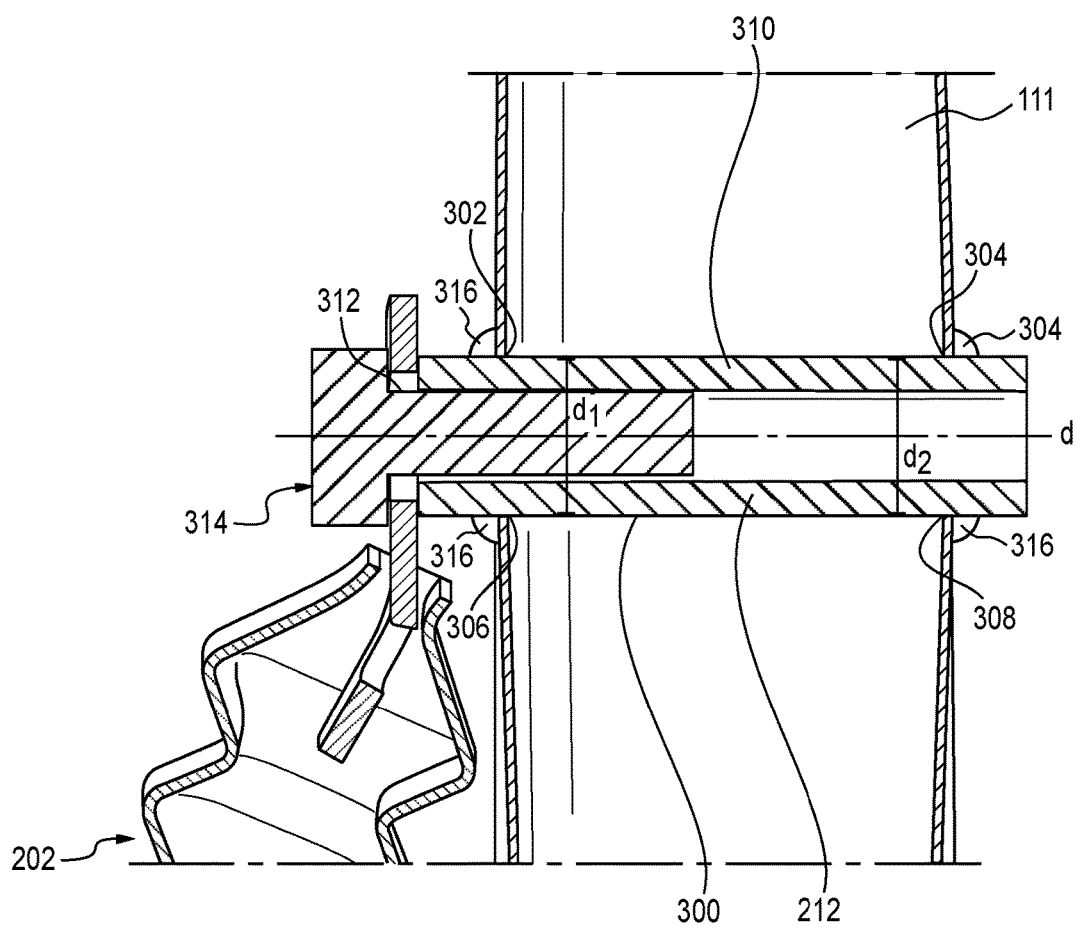
FIG. 3 is a cross sectional view along line A-A in FIG. 2.

FIG. 3, which is a cross-section along line A-A in FIG. 2, illustrates how the collar 212 is attached to the tubular roll bar pipe 111. The tubular roll bar pipe 111 includes a pathway 300 formed by two holes 302, 304 punched in the tubular roll bar pipe 111. The two holes 302, 304 are circular in shape with substantially equal diameters $d_1$, $d_2$. The two holes 302, 304 are aligned along an axis d that is also diameter of the tubular roll bar pipe 111.

The collar 212 is inserted into the first hole 302, through the tubular roll bar pipe 111, which may be a round, hollow tube, and into the second hole 304. In the embodiment illustrated, the collar 212 is welded to the inner edge 306 of the first hole 302 and to the inner edge 308 of the second hole 304, thereby fixedly attaching the collar 212 to the tubular roll bar pipe 111. In addition to welding, the collar 212 may be fixed to the tubular roll bar pipe 111 in any other suitable fashion, such as including nuts on external threads of the collar 212, or by any other method known to one skilled in the art.

As illustrated in FIG. 3, the collar 212 is an internally threaded tube 310. The flange 210 of the anchor 202, which also includes a fastener hole 312, is attached to the collar 212 by a fastener 314. In the embodiment illustrated in FIG. 3, the fastener 314 is a bolt that is inserted through the fastener hole 312 in the flange 210 of the anchor 202 and into the internally threaded tube 310, thereby fixedly attaching the seat belt assembly 122 to the tubular roll bar pipe 111. As previously noted, each of the seat belt assemblies 122 shown in FIG. 1 are attached to the respective tubular roll bar pipe 111 that define the B-pillars 114 or C-pillars 116 in the same manner.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A roll bar system for a motor vehicle, comprising:
    a roll bar pipe having a first hole formed in the roll bar pipe and a second hole formed in the roll bar pipe, a center of the second hole being aligned along a cross-sectional diameter of the roll bar pipe with a center of the first hole;
    a collar disposed within the first hole and the second hole of the roll bar pipe and a having a threaded inner surface, wherein the collar is welded to a portion of a first edge of the roll bar pipe that defines the first hole formed in the roll bar pipe and to a portion of a second edge of the roll bar pipe that defines the second hole formed in the roll bar pipe;
    a seat belt assembly, comprising:
        a seat belt; and
        an anchor, the anchor including an engagement mechanism for engaging the seat belt and a flange having a fastener hole; and
    a fastener for attaching the flange of the anchor to the collar, the fastener being engaged with the threaded inner surface.

2. The roll bar system of claim 1 wherein the fastener is a bolt.

3. The roll bar system of claim 2 wherein the engagement mechanism is a slot disposed within the anchor, the seat belt being threaded through the slot.

4. A system for attaching a seat belt assembly, which includes a seat belt and an anchor including an engagement mechanism for engaging the seat belt and a flange having a fastener hole, to a frame member of a motor vehicle, comprising:
    a collar disposed within a first hole of the frame member and further disposed within a second hole formed in the frame member, a center of the second hole being aligned along a cross-sectional diameter of the frame member with a center of the first hole, wherein the collar is welded to a portion of a first edge of the frame member that defines the first hole formed in the frame member and the collar is welded to a portion of a second edge of the frame member that defines the second hole formed in the frame member, and wherein the collar has a threaded inner surface; and
    a fastener for attaching the flange of the anchor to the collar, the fastener being engaged with the threaded inner surface.

5. The system of claim 4 wherein the fastener is a bolt.

6. The system of claim 5 wherein the frame member is a roll bar.

7. A seat belt assembly, which includes a seat belt and an anchor including an engagement mechanism for engaging the seat belt, attached to a frame member of a motor vehicle, comprising:
    a seat belt;
    an anchor including an engagement mechanism for engaging the seat belt and a flange having a fastener hole;
    a collar disposed within a first hole of the frame member and further disposed within a second hole formed in the frame member, a center of the second hole being aligned along a cross-sectional diameter of the frame member with a center of the first hole, wherein the collar is welded to a portion of a first edge of the frame member that defines the first hole formed in the frame member and the collar is welded to a portion of a second edge of the frame member that defines the second hole formed in the frame member, and wherein the collar further comprises a threaded inner surface; and
    a fastener for attaching the flange of the anchor to the collar, the fastener being engaged with the threaded inner surface.

8. The seat belt assembly of claim 7 wherein the fastener is a bolt.

9. The seat belt assembly of claim 8 wherein the frame member is a roll bar.

* * * * *